United States Patent [19]

Girardin

[11] Patent Number: 5,674,170

[45] Date of Patent: Oct. 7, 1997

[54] MAGAZINE WITH CHANGER FOR LOADING A CNC MACHINE TOOL OR MACHINING CENTER

[75] Inventor: Roger Girardin, Vernier, Switzerland

[73] Assignee: Charmilles Technologies, S.A., Switzerland

[21] Appl. No.: 304,797

[22] Filed: Sep. 12, 1994

[30] Foreign Application Priority Data

Sep. 13, 1993 [CH] Switzerland .................. 02/750 93

[51] Int. Cl.⁶ ............................................... B23Q 3/157
[52] U.S. Cl. ................... 483/59; 211/1.55; 211/70.6; 483/58
[58] Field of Search ........................... 483/30, 16, 31, 483/1, 66, 7, 51, 49, 44, 58, 59; 211/1.52, 1.55, 70.6

[56] References Cited

U.S. PATENT DOCUMENTS

| | | | |
|---|---|---|---|
| 4,008,515 | 2/1977 | Hague et al. ................... | 483/1 |
| 4,814,573 | 3/1989 | Check et al. ................... | 483/16 X |
| 4,870,743 | 10/1989 | Gilmore ........................ | 486/16 |
| 5,028,901 | 7/1991 | Enderle et al. ................ | 483/31 X |

FOREIGN PATENT DOCUMENTS

| | | |
|---|---|---|
| 0406781 | 1/1991 | European Pat. Off. . |
| 0555818 | 8/1993 | European Pat. Off. . |

OTHER PUBLICATIONS

Hirschmann Catalogue SF3691.
EROWA-ROBOT 5/50 Catalogue.

*Primary Examiner*—William R. Briggs
*Attorney, Agent, or Firm*—Gifford, Krass, Groh, Sprinkle, Patmore, Anderson & Citkowski, P.C.

[57] ABSTRACT

A combination magazine and changer for use with a machining head of an electrical discharge machine for rapidly changing a tool. The magazine includes a plurality of separate housings, each of which supports a tool. A retaining means is provided for each housing and creates an attracting force for holding the tools in place. The changer includes a robot arm arranged in proximity to the magazine and which is capable of linear motion relative to the magazine. A mechanical clamping member is mounted to an end of the arm and removes a given tool from the magazine for use in the machining head in a first linear motion and replaces the used tool on the magazine in a second reverse linear motion.

6 Claims, 2 Drawing Sheets

MAGAZINE WITH CHANGER FOR LOADING A CNC MACHINE TOOL OR MACHINING CENTER

This invention concerns a device for loading tools or workpieces into a CNC machine tool or a machining center, in particular in the fields of electrical discharge machining (EDM), milling or grinding, principally in the field of EDM milling.

This device comprises a magazine arranged to receive and store the elements to be changed, whether they be tools, possibly loaded with their tool-holders, or palletized workpieces; this magazine includes a changer to pick up one of these elements and transport it to a nearby machining head, or inversely to bring it back from this head to a housing in the magazine.

The known tool magazines and changers used in EDM generally make use of a linear or circular magazine in which the elements to be changed are locked in their housing; a robot arm is used to transport the elements to be changed, and a numerical control is provided to control movements of the arm and its stops in reference positions, and also to ensure that locking and unlocking on this arm is synchronized with that in the machining head or the magazine. The arm first moves to a precise position located under the magazine so that the element to be transported is unlocked from its locking clamp in the magazine and locked on the arm (or on the contrary so that the element brought from the machining head is unlocked from the arm and locked in its housing); then the arm moves to a reference position facing the machining head (in the case of a tool) or to a chuck mounted on the work table (in the case of a workpiece) so that the element to be transported is unlocked from the head and locked on the arm, or inversely so that the element carried from the magazine is unlocked from the arm and locked on the head. Locking or unlocking of the element from its locking clamp in the magazine and on the arm can be controlled by the numerical control unit of the EDM machine or by a control system provided in the changer. In some cases it is the machining head that serves as the robot arm; sometimes the latter can be built in to the main frame of the machine, as can the magazine. In most cases a pivoting arm is uses, as is the case for example of the H 808 and H 816 made by HIRSCHMANN or the ROBOT 5/50 made by EROWA.

However, in certain kinds of machining, in particular EDM milling, the electrode-tool has to be changed frequently, since it wears very quickly. This is because in this new type of EDM machining a three-dimensional cavity or solid form is machined by hollowing out the electrode-workpiece with a rotary electrode-tool of simple shape that is independent of the desired contour. It is possible to operate by means of successive slices according to the methods described in application EP 555 818 of the applicant. Machining is done with a high rate of wear, with a machining current of very high density, by rotating fine electrode/tools at several thousand r.p.m. Tool changes are thus very frequent, but as the electrode-tools for milling are of standard shape and as their wear is compensated automatically, it is no longer worthwhile to deprive oneself of machining at high speed in order to economize on electrodes. Furthermore these high speed machining settings have many other advantages in addition to the high rate of material removal and those mentioned above: including better surface finish, better stability. There remained the problem of rapid changing of these electrodes, and this is the reason for the development by the applicant of the magazine with the changer of the present invention, which can however also be used to great advantage in other machining applications.

The purpose of this invention was first to provide a magazine with built-in changer making it possible to change the tool without having to lock or unlock it from its housing in the magazine, thus the tool can be changed much more quickly than with known magazines with changers. A second purpose was to provide a robot arm for this changer, having gripping means operated more simply and much more rapidly than those on existing changers, and in particular no longer requiring an electrical or other signal to actuate gripping or releasing. Other purposes were to simplify and to speed up further the necessary positionings and movements by using on the magazine or the gripping arm mechanisms (motor-powered, hydraulic or pneumatic) that are not actuated by signals emitted by the numerical control unit of the machine or of the device of this invention, and also to eliminate precise positioning of the robot arm in front of the housing of the magazine.

The tools (or other elements to be mounted in the machining head, for example a measuring tool) are generally loaded into the magazine with a holding device incorporating the means of gripping it or locking it on the machining head. Hereinafter the term "element" will in general denote the item to be placed in the machining head together with its setting. The applicant has used the fact that the electrode-tools used in EDM milling are in general very light compared to the tools normally used in conventional die sinking, milling or grinding. As regards the workpieces, they are small and are loaded with their pallet in the magazine.

A relatively weak force is therefore sufficient to maintain each element (tool/tool-holder assembly or other kind of assembly) in its housing provided for in the magazine; this force can hence be low enough for the element to be "snatched" from this position by a force applied in the opposite direction by a translating robot arm; this arm is advantageously equipped with means allowing it to hold the element during its translation from the magazine to the machining head or vice versa. The securing of the element at the bottom of the housing, and the clamping/release of the arm's gripping system around the element are actuated by the translation of the arm, as explained below in relation with the drawing. These securing means in the housing and these holding means on the arm are necessary in the variants in which magazine and arm are moving very quickly.

Furthermore, in a preferred variant, the arm and its holding device are arranged so that the latter is in the same horizontal plane as the reference position for the unlocking or locking of the element on the machining head; it is the head that moves vertically so as to grasp and lock the element, or inversely to bring it to the reference position and unlock it once it is gripped by the arm.

Contrary to the robot arms of existing magazines with changers, the robot arm of the present invention neither rotates, nor has an L configuration, but is linear. It is designed to move only in a straight line, from a rest position located above the magazine, behind the housings for the elements to be transported, to the reference position under the machining head to be loaded; contrary to the known magazines with changers, it no longer has to stop at a precise point of its path, facing the housing of the element in the magazine, in order to await the unlocking of the element and the signal ordering it to grip the latter. Moreover, it always moves preferably in the same horizontal plane.

In general the same reference position is provided under the machining head to be loaded, both for the release of a tool that is worn or to be changed, and the locking of a new tool; this position will sometimes henceforth be called "locking position".

The arm of the changer has only to carry out a reciprocating linear movement:

a) either to pick up the element to be changed while it is still locked on the head (the arm's movement from the rest position to the locking position, which ends in abutting against the element, actuating its gripping system) and to convey the element, after unlocking, to the housing provided on the magazine, where this element is caught in passing by the securing means provided in the housing, the arm continuing up to its rest position.

b) or to "snatch" the new element from the magazine while in motion and convey it to the locking position under the head, and once the element is locked, to go back in the reverse direction to its rest position, this latter movement releasing its gripping system.

The originality of the mechanism of this invention is that the robot arm does not stop above the housing to or from which the element to be transported is taken.

The same mechanism can also be used to replace a worn tool, or to replace a tool by one of different diameter, or to replace a tool by a measuring instrument, for example.

The magazine is mobile so as to bring each of its housings in turn to a position facing the machining head.

The reference position under this head, called the "locking position", is set after mounting of the magazine so that it is aligned with the axis of symmetry of the housing facing the head and with the rest position of the arm. The longitudinal axis of symmetry of the arm is moreover the same as this line which joins its rest position and the locking position, or is plumb with it.

Hence for example a circular magazine that rotates around its center can be laid out horizontally, the housings being set around its periphery with their axes of symmetry being the same as some of the radii of the magazine; the robot arm is mounted so that its longitudinal axis of symmetry is plumb with one of the diameters of the magazine. In other arrangements of this invention, a linear magazine, mobile along its longitudinal axis, can be placed horizontally; the housings are set along its side in front of the head with their axes of symmetry all parallel to each other and orthogonal to this side; the robot arm is mounted so that its longitudinal axis of symmetry is orthogonal to that of the magazine.

The magazine can also be set vertically while the arm remains in a horizontal plane; it is then mobile along a vertical plane so as to bring in turn each of its housings in the plane of the arm's reciprocal translations; it is furthermore arranged to position each of its housings so that their axis of symmetry is the same as the line that joins the rest position of the arm and the locking position.

The means securing the element in its housing can be for example a device exerting a permanent magnetic force. But it is also possible to use other means of known type having the same function, allowing an element to be secured in a mobile magazine without resisting the thrust exerted by a robot arm, and having for example a suction grip effect.

The device holding the element on the arm works as a general rule in conjunction with an appropriate profile of the element-setting or mounting; it can be of spring clamp type working in conjunction with an element-mounting with flanges as described in the example, or of any other existing type; all that is needed is that the gripping of the element can be actuated by the thrust exerted by the robot arm against the element secured in the magazine or on the head, and that its release can be actuated by the withdrawal of the robot arm.

In certain variants, the element can be oriented in its housing thanks to angular orientation devices of known type, in order to be mounted on the machining head with the desired angular orientation.

In the following, the invention is described in greater detail in conjunction with the drawing that represents only one of the forms of execution, given as a non exhaustive example. The machine thus represented can receive any modification of form and detail without departing from the spirit of the invention.

Figure 1:
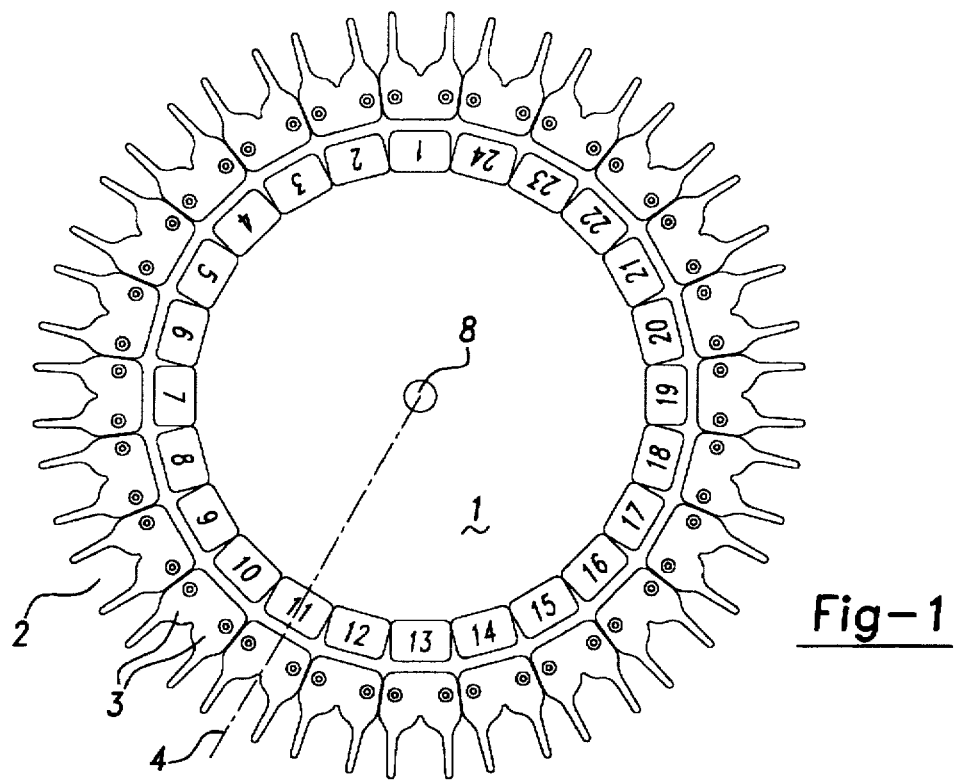
FIG. 1 is a top view of a magazine presented in a machine structure according to the this invention.
Figure 2A:
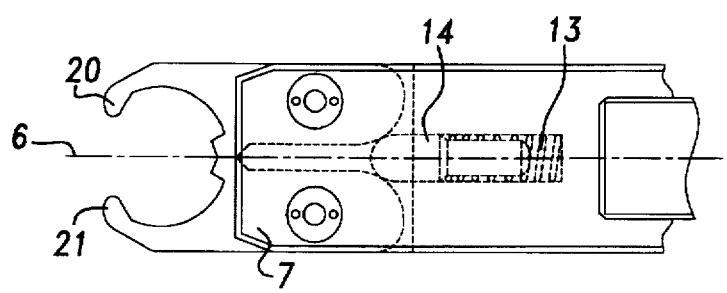
FIGS. 2a and 2b are top views of the end of the robot arm showing the element holding device in its rest position and gripping position.
Figure 2B:
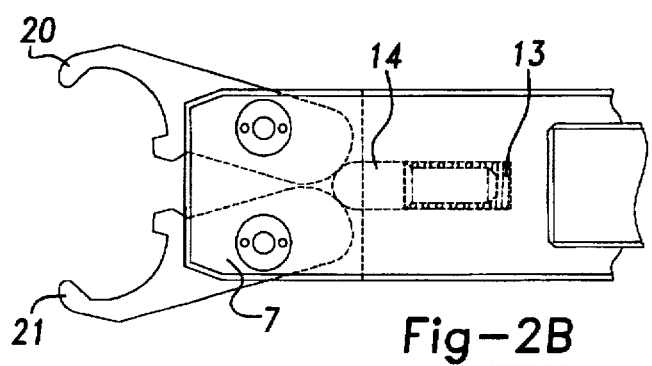
Figure 3:
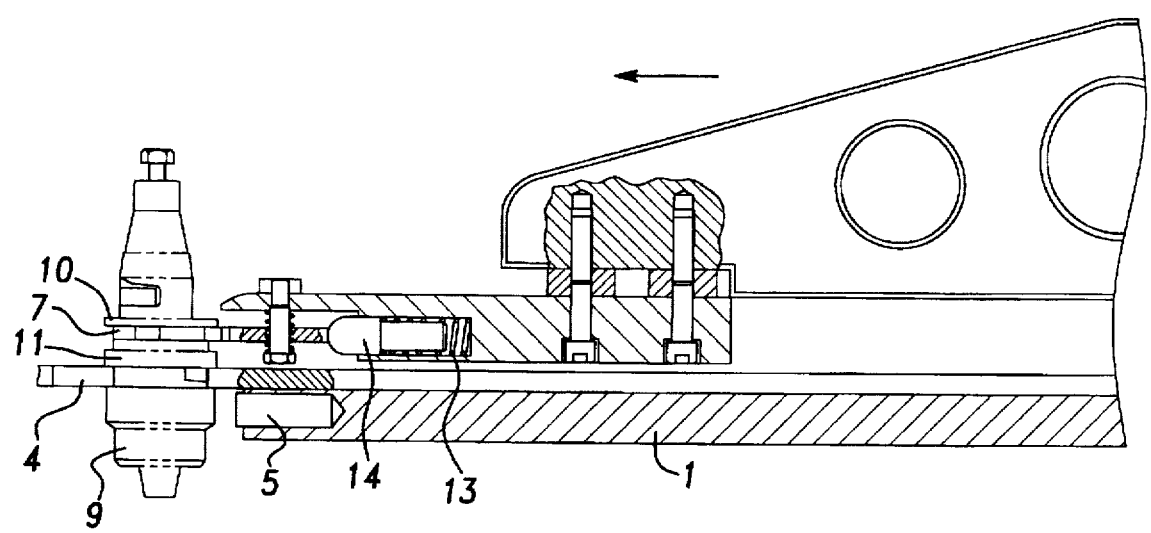
FIG. 3 is a cross section of the end of the robot arm and the edge of the magazine carrying the means securing the element at bottom of the housing when the arm has just snatched from its housing the element to be transported.

The magazine 1 is rotary and circular, laid out horizontally, parallel to the machining plane. Its rotation is controlled by the numerical control unit of the machine tool or of the changer, depending on the element that it is desired to mount on the machine tool or, on the contrary, to remove from the latter. The magazine has 24 housings 2 around its circumference, each designed to secure an element according to a given orientation thanks to a profile of pincer shape 3; the corresponding permanent magnet 5 (shown in FIG. 3) is placed along the axis of symmetry 4 of this profile. The axis 6 of the robot arm, shown diagrammatically in FIGS. 2a and 2b, is positioned plumb with the center 8 of the magazine. This arm ends in a clamp 7 also laid out parallel with the machining plane. Its thickness is suitable to be able to enter in a narrowing arranged on the element holder 9 to be grasped, between the flanges 10 and 11, as illustrated in FIG. 3. This clamp is actuated mechanically by a device with a ball 14 and a spring 13, hence without any electronic signal, as explained in FIGS. 2a and 2b: the element (not shown on the drawing for simplification) is held on the machining head or in the magazine; the translating arm is abutting against it and exerts thus a certain thrust against it; the low resistance of the element suffices to push the spring 13 into its housing which enables the clamp tongs 20 and 21 to open (FIG. 2b) and to grasp the element; then, as the thrust exerted by the arm is no longer being absorbed by the spring, and being greater than the magnetic attraction exerted by the magnet 5, the robot arm snatches the element from the magazine (FIG. 3).

Inversely, when the arm is actuated in such a way as to move away from the element, the tongs 20 and 21 slacken their grip around the element while the spring 13 is released and pushes the ball 14, thus closing the clamp 7.

It has thus been possible to produce a magazine with a changer allowing faster and simpler loading, into a machine tool or machining center, of tools or other items such as measuring instruments, or palletized workpieces, provided they are relatively light. This invention is particularly useful for EDM, especially EDM milling or drilling, for milling, 3D-tracing, and grinding.

I claim:

1. A combination magazine and changer for use with a machining head of an electrical discharge machine for rapidly changing a tool, a numerical control unit controlling the movement and positioning of the machining head and the magazine and signalling the initiation of a cycle of the changer, said combination magazine and changer comprising:

said magazine including a plurality of individual housings, each of said housings supporting one of a plurality of tool electrodes;

retaining means associated with each of said housings for creating an attracting force for securing in place said tools;

said changer including a robot arm arranged in proximity to said magazine and capable of linear motion relative to said magazine, said robot arm having a mechanical clamping means at an end thereof for engaging said tool;

said changer being actuable to complete a linear reciprocating cycle in which said mechanical clamping means engages and removes a given one of said tools from said magazine during a first continuous linear motion, said clamping means receives said tool from the machining head and replaces said tool upon said magazine during a second and opposite continuous linear motion; and said mechanical clamping means comprising a first clamping tong and a second clamping tong, a spring actuated ball mounted within said robot arm exerting a force against said tongs to expand said tongs outwardly to receive said tool, said continued linear motion of said robot arm causing said force of said spring to be relaxed and said tongs to encircle and grasp said tool.

2. The combination magazine and changer according to claim 1, said retaining means comprising a magnet located in each housing for securing said tools in place.

3. The combination magazine and changer according to claim 1, said magazine is rotary in shape with said plurality of housings being arranged circumferentially around an outer perimeter, a longitudinal axis of said rotary arm extending through a midpoint of said rotating magazine.

4. The combination magazine and changer according to claim 1, said magazine and said robot arm being arranged so that an axis of symmetry of a selected one of said plurality of housings and a longitudinal axis of said robot arm merge as a reference line parallel to said arms direction of translation.

5. The combination magazine and changer according to claim 1, said mechanical clamping means is actuated by a thrust exerted by said robot arm against said tool supported within said magazine housing during said linear motions.

6. The combination magazine and changer according to claim 1, said at least one tool comprising an electrode tool used in a milling operation.

* * * * *